United States Patent [19]
Cecotti et al.

[11] Patent Number: 5,556,334
[45] Date of Patent: Sep. 17, 1996

[54] VENTILATION NOZZLE FOR VEHICLE INTERIOR

[75] Inventors: Gerhard Cecotti, Grafenau; Josef Cecotti, Aidlingen; Rolf Röhm, Jettingen, all of Germany

[73] Assignee: Mercedes-Benz AG, Stuttgart, Germany

[21] Appl. No.: 576,433

[22] Filed: Dec. 19, 1995

[30] Foreign Application Priority Data

Dec. 19, 1994 [DE] Germany .......................... 44 45 326.4

[51] Int. Cl.⁶ .................................................. B60H 1/34
[52] U.S. Cl. ......................... 454/155; 454/313; 454/320
[58] Field of Search ................................... 454/155, 202, 454/313, 314, 320, 321

[56] References Cited

U.S. PATENT DOCUMENTS

| | | | |
|---|---|---|---|
| 1,596,900 | 8/1926 | Stacey, Jr. | 454/313 |
| 3,177,797 | 4/1965 | Kennedy | 454/319 |

FOREIGN PATENT DOCUMENTS 3719837  1/1989  Germany .

OTHER PUBLICATIONS

Harding, L. A., *Heating and Air Conditioning Manual*, Buffalo, NY, 1935, p. 186.

*Primary Examiner*—Harold Joyce
*Attorney, Agent, or Firm*—Evenson McKeown Edwards & Lenahan, P.L.L.C.

[57] ABSTRACT

A ventilation nozzle for the interior of a motor vehicle, having a nozzle housing and a set of pivotable fins which extend parallel to one another over the housing opening. For the purpose of obtaining an aesthetic appearance when the ventilation nozzle is installed in curved wall surfaces, the fins and those housing walls of the nozzle housing which are parallel to the fins each have a front edge extending in a curved manner, matching the curvature of the wall surface, and each fin is divided in the longitudinal direction into a front part, which bears the curved front edge, and into a rear part which continues immediately from the front part. The front parts are fastened rigidly in the nozzle housing, whereas the rear parts are held pivotably on the front parts and are coupled to one another for the purpose of a joint pivoting movement.

8 Claims, 2 Drawing Sheets

VENTILATION NOZZLE FOR VEHICLE INTERIOR

BACKGROUND AND SUMMARY OF THE INVENTION

The invention relates to a ventilation nozzle for the interior of a vehicle, having a box-shaped nozzle housing which can be joined to an air duct and is accommodated flush in wall surfaces of the interior, and having a set of mutually parallel, pivotable fins for influencing the direction of flow of air emerging from a nozzle housing opening, which fins extend in the housing opening between two opposite housing walls of the nozzle housing.

In the case of a known ventilation nozzle of this type (German Patent Document DE 37 19 837 C1), the fins are mounted pivotably in those two housing walls of the box-shaped nozzle housing which extend transversely with respect to the direction of extent of the fins, to which end the fins project, for example with a short round pin, into a circular recess in the housing walls. The fins are connected to one another in such a manner by way of a coupling rod, which extends directly along one of these housing walls perpendicularly with respect to the fins, that a pivoting movement of one of the fins leads to an identical pivoting movement of the remaining fins. Mounted on one of the fins is an operating knob which protrudes out of the housing opening of the ventilation nozzle for the purpose of manual gripping. By sliding the operating knob upwards or downwards, the fins can be pivoted, positioning themselves at an acute angle with respect to the longitudinal axis of the housing and thereby influencing the direction of flow of the air flowing out of the ventilation nozzle.

An object of the invention is to provide a ventilation nozzle of the type mentioned above which is suitable for installation in curved wall surfaces in the vehicle interior, such as can be found, for example on the dashboard or in the interior wall panelling of the vehicle doors, and at the same time offers a stylistic and an aesthetically attractive appearance.

This object is achieved according to preferred embodiments of the invention by providing an arrangement wherein the fins and the housing walls of the nozzle housing which are parallel to the fins each have a front edge extending in a curved manner for matching to curved wall surfaces of the interior, wherein each fin is divided in the longitudinal direction into a front part, which ha the curved front edge, and into a rear part which continues immediately from the front part, upstream of the air flow, wherein the front parts of the fins are fastened rigidly to those housing walls of the nozzle housing which extend transversely with respect to the fins, and wherein the rear parts are held on the associated front parts via a pivot bearing and are coupled to one another for the purpose of a joint pivoting movement.

The ventilation nozzle according to the invention can be inserted flush into the curved wall surface, the profile of the front edge of the fins likewise following the profile of curvature of the wall surface. As a result, a visually attractive appearance of the ventilation nozzle integrated in the wall surface is obtained and a closed configuration of the wall surfaced, for example of the front portion of the dashboard or of the instrument panel, which configuration is stylistically attractive for the vehicle occupant, is achieved.

This attractive, aesthetic facade of the ventilation nozzle is also not adversely affected by pivoting the fins, for the purpose of adjusting the air-exit direction, since the front parts of the fins which form the face, with front edges extending in a curved manner, are disengaged from the pivoting movement and are fixed in a spatially non-changeable manner. The pivoting of the rear parts of the fins with the rectilinear rear-edge profile produces the desired air-exit direction and, moreover, has the advantage that all of the fins have a uniform pivoting angle, which is of advantage of conducting the air.

Other objects, advantages and novel features of the present invention will become apparent from the following detailed description of the invention when considered in conjunction with the accompanying drawings.

DETAILED DESCRIPTION OF THE DRAWINGS

Figure 1:
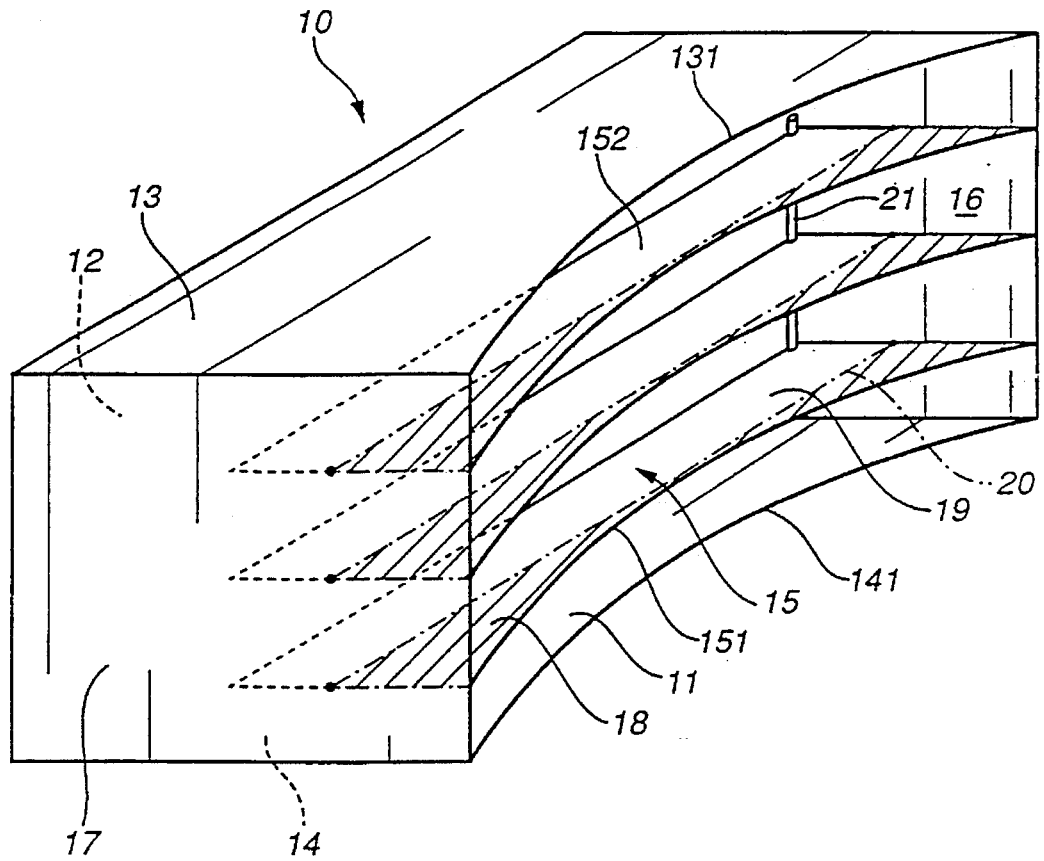
FIG. 1 is a perspective schematic view of a ventilation nozzle constructed according to a preferred embodiment of the invention.

The ventilation nozzle which is represented diagrammatically in FIG. 1 in perspective view is intended for installation in a concavely curved region of a dashboard or of an instrument panel in a motor vehicle. It has an elongate, four-cornered, box-shaped nozzle housing 10 with a front housing opening 11 and a rear housing opening 12. The nozzle housing 10 is inserted into an opening provided in the dashboard, the rear housing opening 12 being fitted onto an air duct and the front housing opening 11 being flush with the front face of the dashboard. To match the curved profile of the dashboard in the insertion region of the ventilation nozzle, the front edges 131 and 141 of the upper housing wall 13 and of the lower housing wall 14 are likewise designed such that they are curved concavely.

Arranged in the nozzle housing 10 is a set of a plurality of fins which extend over the front housing opening 11 parallel to one another and to the upper and lower housing wall 13, 14 and reach as far as the two vertical, lateral housing walls 16 and 17. The clearances between the fins 15 are selected such that they are the same size. The front edges 151 of the fins 15 have exactly the same curved profile as the front edges 131 and 141 of the upper and lower housing wall 13 and 14.

Figure 2:
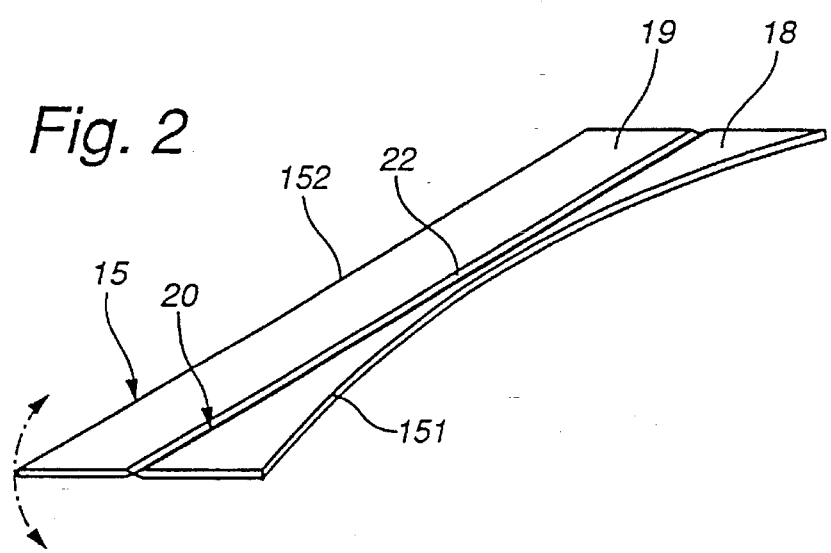
FIGS. 2 and 3 each show a perspective representation of a fin for use in the ventilation nozzle in accordance with FIG. 1, corresponding to a first and second exemplary embodiment.

As is clarified in particular also in FIG. 2, each fin 15 is divided in the longitudinal direction into a front part 18, which bears the curved front edge 151, and into a rear part 19 which continues immediately from the front part, upstream of the flow of air. The front part 18 and rear part 19 are connected to one another in an articulated manner via a pivot bearing 20. The front parts 18 of the fins 15 are fastened rigidly to the lateral housing walls 16, 17. The rear parts 19 of the fins 15, which bear the rectilinearly running rear edge 152 of the fins 15, are connected to one another in an articulated manner by way of a coupling rod which is indicated by 21, extends tight against the right-hand, lateral housing wall 16 and runs parallel to the latter, with the result that when the rear part 19 of one fin 15 is pivoted, the rear parts 19 of the remaining fins 15 execute an identical pivoting movement.

In the exemplary embodiment of the fin 15, represented in FIG. 2, the pivot bearing 20 is formed by a film hinge 22. A known film hinge 22 of this type is produced, when the fins 15 are manufactured from plastic, by a constriction in the material on one or two sides, which constriction extends over the entire separating line between the front and rear part 18, 19.

Figure 3:
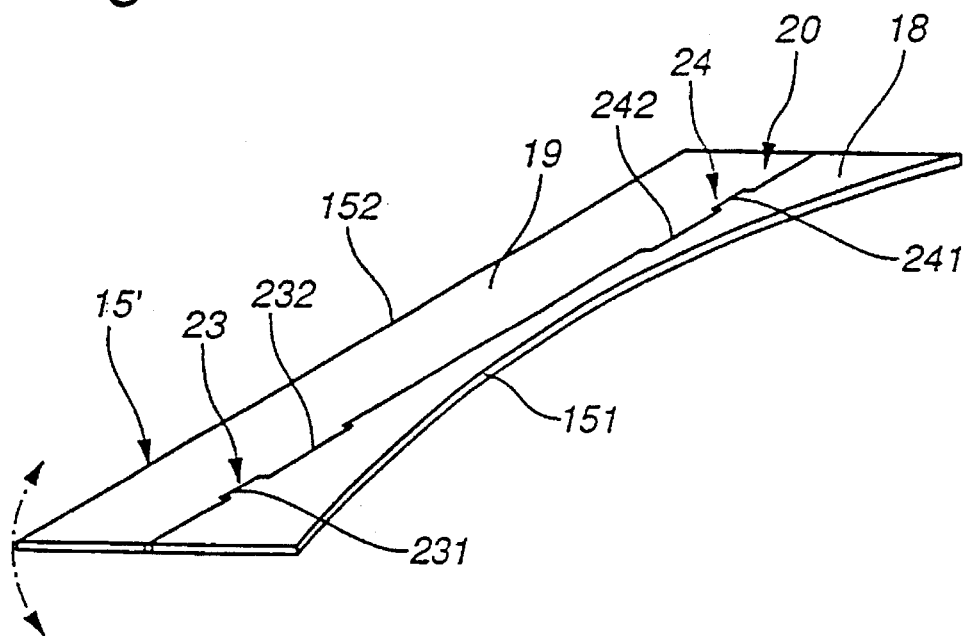

In the case of the exemplary embodiment of the fin 15' in FIG. 3, which is likewise produced from plastic, the pivot bearing 20 is formed by two plastic joints 23, 24 with the joint parts 231,232 and 241, 242. The joint parts 231 and 241 are integrally formed at the same time on the front part 18, and the joint part 232 and 242 on the rear part 19, during the injection-molding process. The joint connection between the joint parts 231 and 232, and 241 and 242, respectively, may, for example, be produced by small, laterally projecting joint pins on one joint part which snap into circular recesses on the other joint part.

Figure 4:
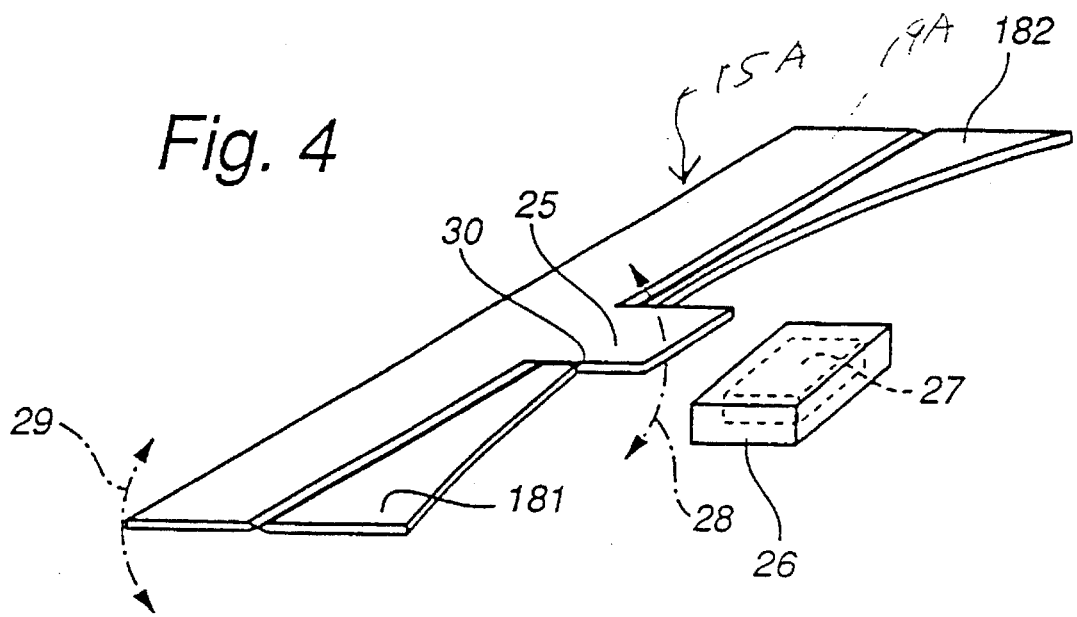
FIG. 4 shows a perspective representation of a central fin in the ventilation nozzle in accordance with FIG. 1, which central fin is designed differently from the other fins.

To adjust the direction of flow of the flow of air emerging from the ventilation nozzle, one of the fins 15, preferably a fin 15A arranged centrally in the nozzle housing 10, is somewhat modified, as is represented in FIG. 4. The front part of this fin 15A is divided transversely with front segments 181 and 182 separated by a gap 30 formed through which a tongue 25, which is integral with the rear part 19A, extends to a point beyond the front edge 151 of the fin 15A. Mounted on the tongue 25 is a control knob 26 which has, for this purpose, a recess 27 into which the tongue 25 can be inserted in a positively locking manner. By pivoting the control knob 26 in the direction of arrow 28 in FIG. 4, the rear part 19A is pivoted upwards or downwards in the arrow direction 29 in FIG. 4, the tongue 25 pivoting through the gap 30 between the two front segments 181 and 182. The pivoting movement of the rear part 19A is transmitted via the coupling rod 21 to the rear parts 19 of the remaining fins 15 which, as a result, execute an identical pivoting movement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Ventilation nozzle for the interior of a vehicle having a box-shaped nozzle housing which can be joined to an air duct and is accommodated flush in wall surfaces of the interior, and having a set of mutually parallel, pivotable fins for influencing the direction of flow of air emerging from a nozzle housing opening, which fins extend in the housing opening between two opposite housing walls of the nozzle housing, wherein the fins and those housing walls of the nozzle housing which are parallel to the fins each have a front edge extending in a curved manner for matching to curved wall surfaces of the interior, wherein each fin is divided in a longitudinal air flow direction into a front part, which has the curved front edge, and into a rear part which continues immediately from the front part, upstream of the air flow, wherein the front parts of the fins are fastened rigidly to those housing walls of the nozzle housing which extend transversely with respect to the fins, and wherein the rear parts are held on the associated front parts via a pivot bearing and are coupled to one another for the purpose of a joint pivoting movement.

2. Nozzle according to claim 1, wherein respective pivot bearings between the front and rear parts are formed by a film hinge which extends over the entire length of the respective fins.

3. Nozzle according to claim 2, wherein the respective fins are manufactured from plastic and the film hinges are produced by means of a constriction in the material along a separating line of the front and rear part.

4. Nozzle according to claim 1, wherein respective pivot bearings between the front and rear parts are formed by at least one plastic joint, the joint parts of which are respectively injection-molded onto the associated front and rear part of the fin, which front and rear part are manufactured separately from plastic.

5. Nozzle according to claim 1, wherein the front part of one fin of the set of fins is divided transversely, in the direction of the air flow, and a gap is provided between the two front segments, and wherein the rear part integrally bears a tongue which passes through the gap, protrudes over the front edge of the fin and serves to accommodate a control knob.

6. Nozzle according to claim 2, wherein the front part of one fin of the set of fins is divided transversely, in the direction of the air flow, and a gap is provided between the two front segments, and wherein the rear part integrally bears a tongue which passes through the gap, protrudes over the front edge of the fin and serves to accommodate a control knob.

7. Nozzle according to claim 3, wherein the front part of one fin of the set of fins is divided transversely, in the direction of the air flow, and a gap is provided between the two front segments, and wherein the rear part integrally bears a tongue which passes through the gap, protrudes over the front edge of the fin and serves to accommodate a control knob.

8. Nozzle according to claim 4, wherein the front part of one fin of the set of fins is divided transversely, in the direction of the air flow, and a gap is provided between the two front segments, and wherein the rear part integrally bears a tongue which passes through the gap, protrudes over the front edge of the fin and serves to accommodate a control knob.

* * * * *